(12) United States Patent     (10) Patent No.: US 9,338,251 B2
Mehta et al.     (45) Date of Patent: May 10, 2016

(54) SOCIAL-MOBILE-LOCAL (SML) NETWORKING WITH INTELLIGENT SEMANTIC PROCESSING

(71) Applicant: NimbleCat, Inc., Fremont, CA (US)

(72) Inventors: Sunil Mehta, Fremont, CA (US); David Meyer, Spanish Fork, UT (US); Poonam Murgai, Fremont, CA (US); David O. Seaver, Sunnyvale, CA (US)

(73) Assignee: Niimblecat, Inc., Fremont, CA (US)

( * ) Notice: Subject to any disclaimer, the term of this patent is extended or adjusted under 35 U.S.C. 154(b) by 0 days.

(21) Appl. No.: 13/865,202

(22) Filed: Apr. 18, 2013

(65) Prior Publication Data

US 2013/0282819 A1     Oct. 24, 2013

Related U.S. Application Data

(60) Provisional application No. 61/625,680, filed on Apr. 18, 2012.

(51) Int. Cl.
    *G06F 15/16*     (2006.01)
    *H04L 29/08*     (2006.01)
    (Continued)

(52) U.S. Cl.
    CPC .............. *H04L 67/306* (2013.01); *G06Q 10/10* (2013.01); *G06Q 50/01* (2013.01); *Y02B 60/50* (2013.01)

(58) Field of Classification Search
    USPC .................................................. 709/204, 205
    See application file for complete search history.

(56) References Cited

U.S. PATENT DOCUMENTS

| 7,310,676 B2 | 12/2007 | Bourne |
| 7,593,740 B2 | 9/2009 | Crowley et al. |
| 2008/0209011 A1 | 8/2008 | Stremel et al. |

(Continued)

FOREIGN PATENT DOCUMENTS

WO     WO2010150256 A2     12/2010

OTHER PUBLICATIONS

Einarsdottir et al., "ScatterFriend: A mobile social network using the Beddernet P2P middleware," available at <https://blog.itu.dk/SPVC-E2010/files/2011/08/4scatterfriend.pdf>, (2010).

*Primary Examiner* — Vivek Srivastava
*Assistant Examiner* — Hermon Asres
(74) *Attorney, Agent, or Firm* — Proxigee Legal Transactions; Elizabeth A. Nevis, Esq.

(57) ABSTRACT

A social-mobile-local (SML) system and environment includes user mobile devices, a distributed communications network over which the devices communicate, a means of sensing proximity between pairs of mobile devices, and one or more SML databases and programs resident on the user mobile devices, on remote computers, or both. Challenges addressed include prevention of "alert flooding," privacy protection, credential verification, entering detailed data on mobile devices, power-saving, and improved quality in both the choice and the content of notifications. Solutions include the aggregation of online information about a user to create an aggregate profile, enabling the user to create multiple personas by selecting what information from the profile or from other sources to reveal to other users under which circumstances, enabling the user to broadcast "wants" and preview what is available in the vicinity, linguistic analysis detecting nuanced correspondences between terms entered for wants and filtering out purely incidental word-matches, and adaptive algorithms to make the best use of battery power and other resources in dynamic surroundings.

20 Claims, 5 Drawing Sheets

(51) Int. Cl.
*G06Q 10/10* (2012.01)
*G06Q 50/00* (2012.01)

(56) References Cited

U.S. PATENT DOCUMENTS

2009/0005040 A1* 1/2009 Bourne ................. H04L 12/588
                                                            455/435.1
2010/0082667 A1    4/2010 Callanan et al.
2010/0280904 A1    11/2010 Ahuja
2011/0072071 A1    3/2011 Macwan
2011/0173174 A1*   7/2011 Flitcroft ............ G06F 17/30864
                                                             707/707
2011/0276639 A1*   11/2011 Schrader ................ G06Q 30/02
                                                              709/206
2012/0023136 A1    1/2012 Kuo et al.
2012/0059729 A1    3/2012 Roa et al.
2013/0281118 A1*   10/2013 Lipman ................... H04W 4/02
                                                              455/456.1

* cited by examiner

SOCIAL-MOBILE-LOCAL (SML) NETWORKING WITH INTELLIGENT SEMANTIC PROCESSING

RELATED APPLICATIONS

This application claims priority to U.S. Prov. Pat. App. No. 61/625,680, filed 18 Apr. 2012, the entirety of which is incorporated by reference herein for all purposes.

BACKGROUND

Related fields include artificial intelligence in management of a knowledge base and tracking the position of an object relative to a reference system.

Mobile social networking expanded into the dimensions of "real life" when (1) global positioning satellite (GPS) services became common on cellular phones, smart-phones, personal digital assistants (PDAs) and tablet computers (collectively "mobile devices"), and (2) social-network service providers (SNSPs) became able to collect location data from member devices. SNSP software (usually, but not always, on one or more servers) identifies co-located member devices by their transmitted GPS coordinates. "Co-location" might be measured as some sub-threshold proximity of the devices to each other, or to a venue whose coordinates are stored in a database. The software compares stored user profiles and social-network connections corresponding to the co-located devices and sends alerts to the devices upon detecting a correspondence: for instance, if two or more of the co-located devices belong to first- or second-degree contacts in the SNSP's network, or to people whose profiles share a common feature such as an interest or an affiliation of education or employment.

These "social-mobile-local" (SML) innovations are a boon to attendees trying to find each other at large events, to travelers visiting unfamiliar places, and to those simply finding themselves with "alone time" they would rather spend with others socially, professionally, or commercially. Early adopters were those able to afford sophisticated mobile devices, who had plentiful excess time and ambition to learn how to use the software and get the most out of their mobile devices. Mobile device price-per-capability decreased, yet many potential users who could benefit from using the software found it cumbersome to learn and execute.

In some cases, the user had to "check in" with the SNSP at every new location, which can be easily forgotten during a day of sales calls or an evening of multiple holiday parties. On the other hand, systems that constantly tracked a device's GPS coordinates quickly drained device batteries and triggered user privacy concerns. Generally, a user had to create a new profile just for the SML database, and could not import it when switching SNSPs.

Even within a single SNSP, one profile was not always enough. Increasing employment mobility made constant professional networking a matter of economic survival—not only in traditionally connection-critical fields such as sales, public relations, and politics, but for everyone. Meanwhile, people still had social needs to be themselves, express themselves, and find companions like themselves. When both pursuits jumped to cyberspace, collisions were inevitable. Individuals were rejected for employment, and even fired from present jobs, solely for things said and done online by their "social selves." Meanwhile, those who scrupulously limited their online presence to uncontroversial professionalism languished in social isolation unless blessed with a random serendipitous offline encounter with a coincidentally compatible other.

Typical work-arounds in the SML context included deactivation ("don't tell anyone I'm here"), preventing co-location alerts to specific other users ("don't tell my parents or my boss I'm here") and dedicated multiple profiles ("tell people here that I'm a single guitar player, but not that I'm a tax auditor"). For the users, frequent impacts were more work (switching activation levels, profiles, and see-me lists several times a day) and missed connections.

Even where multiple work-arounds were needed, SML software for mobile devices ("SML apps") evolved in ease of use as capable mobile devices became more available. A side effect of this was "alert flooding" or "notification spam." Consider a user arriving at a major-league sports stadium. When SML was new, the user's mobile device would display a handful of alerts about connected or interest-sharing owners of sufficiently sophisticated devices who chose to subscribe to the SNSP and allow it to advertise their location. Later, half or more of the 10,000 fans at the stadium might have the same app on their devices and list an interest in the stadium's sport or team in their profile. Too much information may be better than none, but where does one begin to comb through 5,000 alerts to find the 5 or 6 upon which the user might really want to act?

In addition, the same uncertainties of meeting a stranger apply to SML as to online and non-technological situations: "Here is a stranger who thinks we would benefit by some kind of exchange, but (absent an recommendation by someone I trust) how do I know I can trust the stranger at least to the limits of the exchange? Meanwhile, the stranger may be wondering the same thing about me; how do I prove my suitability for the exchange without exposing my identity to misappropriation or misuse?" The criticality of these issues can vary widely depending on the nature of the exchange. For example, these questions do not loom very large in the sale of a snack, but quite large in the hiring of a home remodeler.

Therefore, a need exists for an SML environment where networking with professional decorum and social enjoyment can both be accommodated, separately if appropriate. Preferably, the environment would strike a palatable balance between the verification of credentials and the discouragement of identity theft and other misappropriation of personal details. Ideally, this functionality would not be laborious for the user to implement, nor would it demand frequent diligent attention to operate.

SUMMARY

A social-mobile-local (SML) system and environment successfully delivers tailored alerts, relevant to the information each user wants to give and receive, even in environments where a large crowd of people share specific common interests that would otherwise swamp users' mobile devices with large numbers of irrelevant proximity alerts.

Users may create multiple personas to tailor the information they reveal about themselves to the needs of specific social contexts. Persona creation may be simplified by the system's aggregating of online social profiles and other data when a user opens an account and grants access. The SML system and environment can automatically and simultaneously reveal different personas of the same user to different co-located other users depending on those users' personas, profiles, and the wants they have registered with the system.

A user may further mask features of the persona to be revealed only when an alert recipient answers a challenge.

These features help users protect their privacy and deter identity theft. When a pair or group of users do decide to communicate further after being alerted to one another's presence, the persona structure allows them to share authentications such as links to personal or corporate websites, online social-network profiles, documents, scores, digital certificates, and other digital entities that can validate each person's identity if and as needed.

At any place and time, a user may register a "want" and the SML system will search for a correspondence within the proximate location. For instance, if a user registers a want to buy a bicycle, the system will alert that user if it "knows," through another user's want or through other data the other user has made accessible, that someone in the proximate area has a bicycle to sell. The system uses linguistic analysis to find correspondences that would not emerge from simple word or root matching, and to weed out non-correspondences that just happen to use some of the same words and roots. In some embodiments, auto-complete choices for users entering custom text are chosen and ranked based on what is known to be available in the proximate area.

A particular embodiment includes an "identity want," which broadcasts a user-chosen characteristic or situation only to those who have registered a substantially similar identity want. This helps people find others who are like themselves without advertising that characteristic or situation to the world at large. When a correspondence is found, personas and challenges can be used to authenticate the basis of the correspondence to protect bona-fide participants from those whose motives or credibility might be questionable.

Wants and personas work together to provide as many or as few alerts as a user desires, and to ensure those alerts are relevant to the user's needs. A user may, while registering an "outgoing" want, assign a persona to appear in all the alerts about that want. A user may also assign different personas to appear in response to different types of "incoming" wants.

Adaptive algorithms control proximity-search radii and search frequency to provide speedy responses to user input while preserving bandwidth and battery life.

DETAILED DESCRIPTION

The streamlined SML environment hinges on a dynamic interplay between personas and wants. Personas are selectively exposed aspects, or subsets, of a user profile. The user profile may be an aggregated profile from multiple social-network profiles of the same individual. Wants are queries from the user to a local portion of an SML database, representing something the user is looking for or offering.

Figure 1:
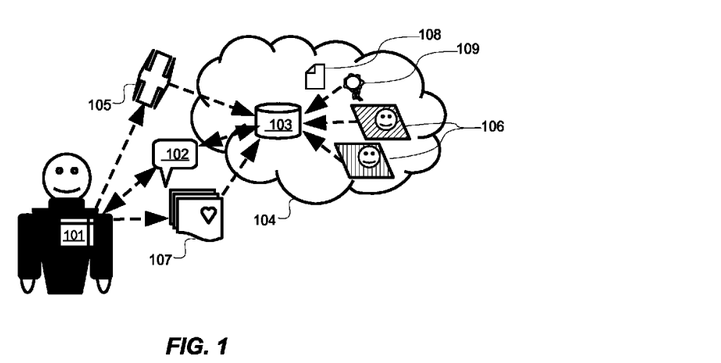
FIG. 1 is a conceptual overview of how a user's mobile device interacts with the SML environment.

FIG. 1 is a conceptual overview of how a user's mobile device interacts with the SML environment. User's mobile device 101 exchanges data and instructions 102 with the programs and databases 103 that make up the SML environment. Mobile device 101 and SML environment 103 communicate through one or more geographically distributed hardware networks represented as "cloud" 104.

Mobile device 101 also has a feature for sensing location, proximity, or both, such as a transponder communicating with global position sensing (GPS) satellite 105. Other ways of sensing location or proximity include sensing of overlaps between personal-area networks such as Bluetooth®, and sensing the presence of a wireless network such as a building's WiFi signal.

A user may use mobile device 101 to instruct and authorize SML environment 103 to access the user's data from other data-stores in cloud 104, such as documents, scores, authentications, and online profiles 106 from Web-based social networks. A user may also register "wants" 107, which are things or personal characteristics for SML environment 103 to look for among the information made available by other nearby users. Finally, the user may add, subtract, and modify information drawn from online profiles 106 to create "personas," which are subsets or aspects of the user's identity that the user employs when introducing him- or her-self to another user before initiating (or, in some cases, deciding whether to initiate) a face-to-face meeting.

Figure 2:
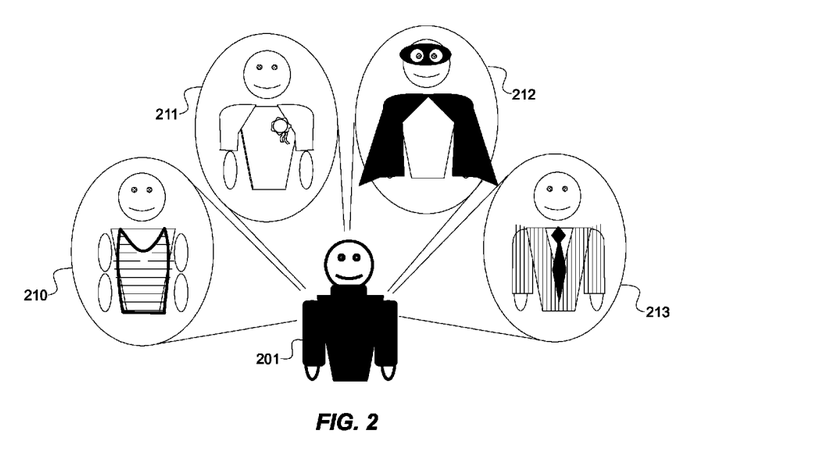
FIG. 2 illustrates the analogue of the persona concept used in non-technological human interaction.

Personas:

FIG. 2 illustrates the analogue of the persona concept used in non-technological human interaction. In most societies, person 201 is socially conditioned to behave, appear, and interact appropriately when others are present. Different appearances, manners of speech, demeanors and actions are called for in different occasions. Person 201's "inner persona" 210 has thoughts, feelings, opinions that may be selectively hidden or shared. When inner persona 210's impulses do not fit the setting, person 201 will "edit out" the misplaced/mistimed impulses or leave the setting. Person 201's "official persona" 211 has external credentials (driver's license, diploma, bank accounts, etc.) that must routinely be presented, verified and used; simultaneously, they must be protected from a constant threat of theft and misuse. "Fantasy persona" 212 represents a temporary role such as game character, stage role, pen name, or the like. "Work persona" 213, where the person acts as a representative of an employer or client, is perhaps the most common type of temporary role.

To create a persona in the SML environment, a user may select aspects of a master profile to reveal in the particular persona. Preferably, the master profile is automatically aggregated by the system from that user's profiles in other networks, sites, databases, and the like. In one embodiment, the user may link one or more existing online profiles (e.g. Facebook®, LinkedIn®) to the SML environment, such that whenever the user updates one of the linked profiles, the database updates the aggregated SML master profile automatically.

Figure 3:
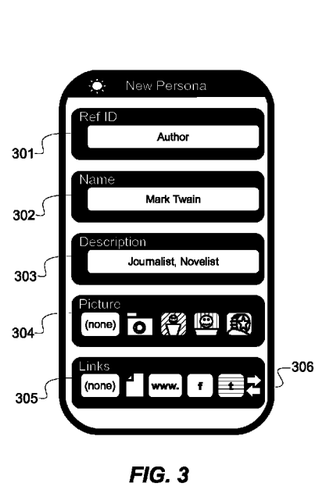
FIG. 3 illustrates a non-limiting example of a user-interface display on a mobile device for creating a new persona.

FIG. 3 illustrates a non-limiting example of a user-interface display on a mobile device for creating a new persona. A user would see a screen like this after entering a "Create New Persona" command, fill in blanks 301-303, and make one or more selections from menus 304 and 305. Reference ID 301 is a "shorthand" that will later help the user quickly identify the persona. Here the user has entered "Author" because he will use this persona when he interacts as the author of his writings. Display name 302 is the name that will be shown to recipients of proximity alerts about this new persona. Here, he uses the pen name associated with his works of authorship, "Mark Twain" (he may also have "Personal" or "Family" personas that display a different name such as "Sam Clemens"). In description 303, the user may enter any particulars about the persona, such as the writing specialties illustrated here ("Journalist, Novelist"). Other particulars may include school or work affiliations, interests, and relationships; for example, this user's "Parent-Teacher Association" persona might have "Father of Susy, Clara, and Jean Clemens" in description 303.

Picture menu 304 allows the user to select what kind of picture or graphic, if any, will be displayed in alerts about this persona. The user may click or otherwise select "(none)" to display no picture or, in camera-equipped mobile devices, the camera icon to take a persona picture instantly. Other selections are thumbnails of pictures and other graphic identifiers (e.g., company logo, screen avatar, monogram) that the user has previously used or uploaded, or that the SML database has aggregated from the user's other online accounts (e.g. Web-based social, site-user, or game-player accounts).

Link menu 305 allows the user to select what kind of online information about this persona, if any, will be made available to recipients of proximity alerts about this persona. Options illustrated here by way of non-limiting example include (from left to right) Website addresses (perhaps Mr. Twain's "Mississippi River Travel Blog"); documents associated with the user's SML account such as resumes, work samples, and connection lists or graphs; and profiles on other social networks such as Facebook® and Twitter®. Selecting some of these menu icons may open another tier of selections, such as directional arrows 306 that appeared when the user selected the Twitter® button to the left of the arrows. The user can select the arrow pointing "outward" from the Twitter® button to give alert recipients a way to view what he recently posted to Twitter® ("tweeted"). Selecting the "inward-pointing" arrow gives alert recipients a way to view the user's Twitter feed (tweets from others that the user has chosen to receive). Other second-tier selections could include a list of sites or personal pages that the user registered to the main SML account. This list could pop up when the user selects the "www." button so that the user need not type the full Web address of the site on the mobile device.

Other potential features to add to personas include scores. Professional rankings, grade-point averages, credit scores, game levels or sports averages, and indices of connectedness may all be useful to display in alerts in some situations.

Figure 4:
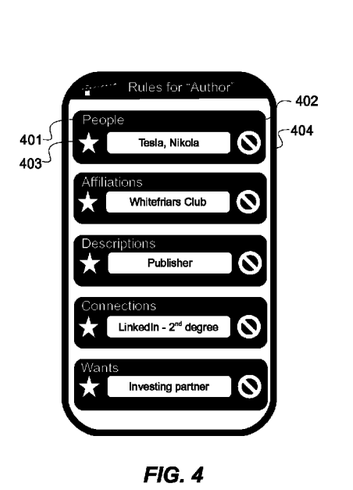
FIG. 4 illustrates a non-limiting example of a user interface for setting up or modifying rules for displaying a persona.

Once the new persona is created, the user decides who will or will not see it. FIG. 4 illustrates a non-limiting example of a user interface for setting up or modifying rules for displaying a persona. In the fairly simple embodiment illustrated here, for each taxonomy 401, the user can scroll to, click on, type, type with auto-complete, or otherwise select a subset 402. The user can then tell the SML system whether the selected subset should always (e.g. by selecting "star" 403) or never (e.g. by selecting "bar" 404) be alerted to the proximity of the persona being created or edited. In some embodiments the user need not "star" or "bar" every entry in each of the lists. Those entries left alone will be alerted to the persona's proximity or not based on other conditions, such as whether the respective users have current wants that correspond.

In some embodiments the rules are arranged in a cascading hierarchy. For example, individual selections may supersede all the other taxonomies: people specifically "starred" or "barred" will be included or excluded, respectively, from alerts about the persona whether or not they also belong to any of the included or excluded groups: "Never show this persona to professors" (description) "at University of Kansas" (affiliation) "except always show it to Dr. Burroughs" (individual). Similarly, affiliation may supersede description: "Always show this persona to all recruiters" (description) "except never to those who work for my current company" (affiliation). The hierarchy may be arranged by the system, the user, or both in any useful order. In some embodiments, individuals may be included or excluded by a main account name ("Samuel Clemens") or a persona name ("Mark Twain") and the system will apply the rule to all the personas attached to that account. Similar measures can be attached to other types of taxonomies.

In some embodiments, the user is first asked to create a default "Safe" or "Public" persona that the SML environment will display if it is unsure which persona is appropriate. The SML database takes its cues primarily from user instructions. Some embodiments can intelligently interpolate or extrapolate to uninstructed situations that are near, or between, instructed situations. The "Safe" persona may be deliberately selected for some situations, but it becomes the default in the absence of instructions or reasonable system inferences. The "Safe" persona only includes information that the user would not mind displaying to a parent, clergyman, child, employer, news reporter, or other potentially sensitive recipient. The "Safe" persona may also be restricted to information of little or no interest to identity thieves: no full street address, phone number, or indicators of income or valuable possessions.

Figure 5:
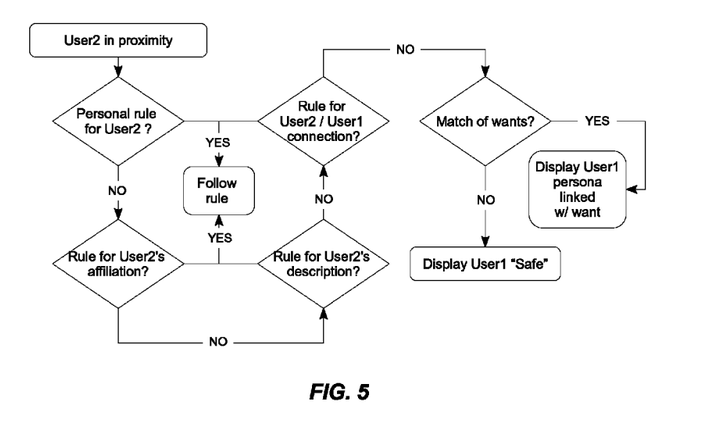
FIG. 5 is a flowchart demonstrating how the system might handle persona alerts through one possible set of cascading rules.

FIG. 5 is a flowchart demonstrating how the system might handle persona alerts through one possible set of cascading rules. The SML environment senses that User1 and User2 are in proximity; perhaps their GPS coordinates are very close together, or their personal-area wireless networks (e.g. Bluetooth®) overlap, or they are both within range of some common signal such as a building's WiFi. The flowchart shows what happens from the point-of-view of User1's mobile device. Meanwhile, a reciprocal process occurs on User2's.

Once the proximity of another user is sensed and that user is identified, the system first runs through User1's hierarchy of rules to see if any of them apply to User2. The first applicable rule found is followed. If no rules apply to User2, the system checks for correspondence between the users' wants or personas. If a correspondence is found, the corresponding alert is sent. In the absence of an applicable rule or correspondence, the system falls back on a default. In the illustrated flowchart, the default is to alert User2 of the proximity of User1's "Safe" persona. A different embodiment's default might be not to send an alert.

In some embodiments, users may add, delete, or edit personas at any time. One variation gives users the option to create a new persona either from a blank or by editing an existing persona. The "Safe" persona may be a convenient default choice to edit because all the edits are "adds" and the user need not worry about forgetting to subtract something from a more revealing persona.

Another way to create a default persona is for the user to designate one as "current" at any given time. Friends and close contacts could then see status updates such as "relaxing" or "traveling" simply by which of a user's personas was selected with a single click. Professionals keeping late or early hours may, by keeping their "at work" persona current, let clients and contacts know that they are still (or already) available to discuss work.

Challenges are a further optional enhancement to personas that allow the user to reveal only part of a persona initially, then reveal more if s/he is satisfied that the recipient should see it. This is similar to non-technological social interactions, where many people reveal very little of their personal details when initially meeting a stranger.

Figure 6:
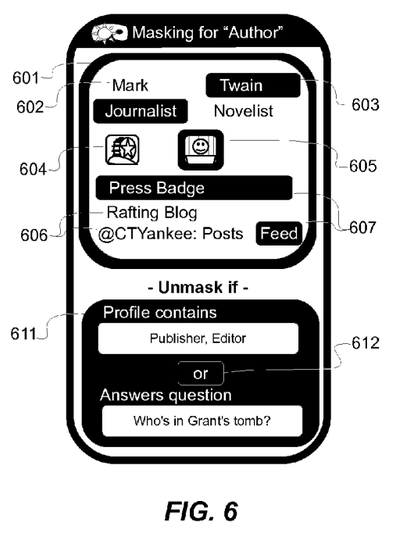
FIG. 6 illustrates a non-limiting example of a user interface for implementing challenges.

FIG. 6 illustrates a non-limiting example of a user interface for implementing challenges. After a persona is created, the user may select parts of the persona to initially "mask" unless criteria are met. In information window 601, the user selects what to mask. Here, the user highlights the information to mask, such as last name 603, picture 605, and credential and feed links 607. Therefore, most alert recipients that are caused by the rules to see the "Author" persona initially see only the un-highlighted information such as first name 602, logo 604, and blog and post links 606. Parts of the description can also be masked: here, the user doesn't care who knows he's a novelist, but wants to be selective as to who learns he's a journalist.

In challenge window 611, the user defines the conditions for revealing the masked portions of the "Author" persona. Here, he wants to show the whole persona to all editors and publishers; they might have work for him. He also is willing to meet people interested in political issues such as the burial of President Grant, so he writes a question that will serve as a "pass filter" for them. Another option for a challenge is an assignment to perform some task, such as requesting a club disc-jockey to play a particular song. In some embodiments, logical connector 612 is selectable (for instance, the user could link conditions with "and" rather than "or," resulting in a stricter filter.

Even users who see themselves as having completely unified identities can benefit from using personas. One example is the user who works in a highly specialized field. At a family reunion or gathering of volunteers for charity, she might display her occupation in description 203 as "Scientist." At the company picnic where there are many scientists, she might choose to display "Physicist." At a professional conference of many physicists, she might display "Theoretical particle physicist extrapolating trajectories of by-products of radioactive decay." Her fellow conference attendees appreciate such specificity, whereas new acquaintances in her volunteer group might be much more comfortable with a casual general description.

Because there are still places or occasions where mobile-device connection is not possible—areas of poor reception, or when someone's device malfunctions or its battery drains—personas may also be made accessible through outside-the-computer identifiers such as barcodes or quick-response (QR) codes that may be printed on documents such as business cards, advertising flyers, or resumes. Many camera-equipped mobile devices can read these codes from a camera snapshot. In some embodiments, photographing the printed code with the SML environment running (or importing a stored snapshot into the SML environment) displays the corresponding persona.

Wants:

Another way the SML environment approaches tailoring of the user experience is its handling of registered "wants." A want can be a request for something (goods, services, information, contact, etc.), an offer of something, or a selective announcement such as "Tell others that I am (some type of person), but only if they are (the same or some complementary type)".

Figure 7:
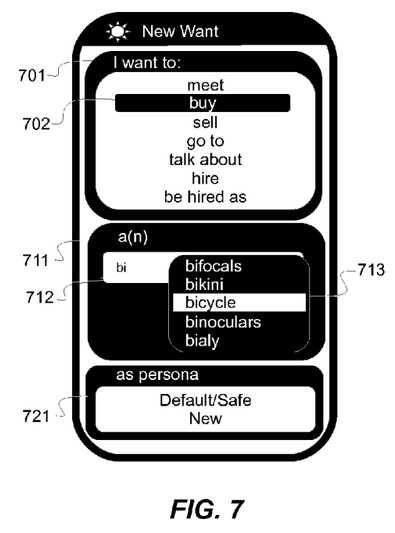
FIG. 7 illustrates a non-limiting example of a user interface for registering a new want.

FIG. 7 illustrates a non-limiting example of a user interface for registering a new want. In verb window 701, the user chooses a desired action 702. In this example, action 702 is selected from a scrolling list, but other methods of entry including drop-down lists, checkbox lists, and entering text with and without auto-complete can be used. In noun window 711, the user enters or selects the wanted object. In this example, the user begins entering text in blank 712, and a pop-up list 713 offers options for completing the noun or noun phrase. As shown here, the user has found the wanted object "bicycle" on the list and selected it. Here also, other suitable ways of entering or selecting the noun or noun phrase are compatible with the concept. Optionally, a persona window 721 can allow the user to choose a persona to display with the want, or create a new one.

In some embodiments, the selections in the list boxes, scrolls, auto-complete pop-up windows, or other system-interpolated or -extrapolated lists are sensitive to location or proximity. For example, if the system knew of no nearby establishment or user with a bikini to sell, "bikini" would not appear on pop-up list 713. However, the user could still type in "bikini" and let the system find the closest correspondence.

Figure 8:
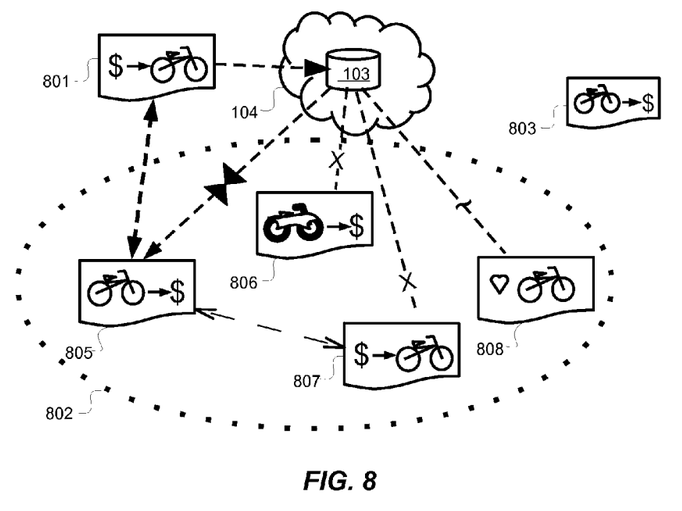
FIG. 8 is a flowchart of an embodiment of finding and handling correspondences between proximate wants.

FIG. 8 is a flowchart of an embodiment of finding and handling correspondences between proximate wants. A user registers a want to buy a bicycle, 801. SML environment 103 operating in distributed network "cloud" 104 receives buy-a-bicycle want 801 and compares it to other wants within and around proximate region 802. Wants detected inside proximate region 802 include sell-a-bicycle 805, sell-a-motorcycle 806, second buy-a-bicycle 807, and persona-likes-bicycles 808. Second sell-a-bicycle 803, outside region 802, is not initially detected.

The SML environment sends an alert about the correspondence (reflected triangles) about sell-a-bicycle 805 to buy-a-bicycle 801 and vice versa. It does not alert ("X") 801's device about sell-a-motorcycle 806 or second buy-a-bicycle 807, although it has probably already notified second buy-a-bicycle 807 and sell-a-bicycle 805 about each other. Depending on the embodiment, the 801 user's preferences, and the detection of more closely corresponding wants in region 802, buy-a-bicycle 801 may or may not be alerted about likes-bicycles 808. The 808 user may not presently have a bicycle for sale, but may know someone who does. In some embodiments, the 801 user may instruct the SML system to expand proximity-search region 802, in which case second sell-a-bicycle 803 may be detected and caused to exchange alerts with buy-a-bicycle 801.

As this example demonstrates, correspondences are considerably more nuanced than simple matches. A simple match to "bicycle" or "-cycle" in region 802 would have given the user with buy-a-bicycle want 801 many more alerts, most of which would not have been opportunities to buy a bicycle. Instead, the system pairs the request-type want "buy" exclusively (or at least preferentially) with the complementary offer-type want "sell," and similarly with other pairs such as "hire" and "find a job as," "teach" and "learn about," "drive" and "ride," "provide a service" and "engage a service," or the like. The correspondence-analyzing function of the SML environment thus acts to prevent alert flooding or "notification spam." The system also keeps track of which wants are self-corresponding, such as "share," "discuss," or "tell others like me that I am."

Some embodiments may warn a user if a want is expected to trigger excessive alerts in a proximate area. For instance, at a general-merchandise swap-meet, perhaps only 2 or 3 vendors might have a bicycle for sale, so a buy-a-bicycle want would return a reasonable number of alerts. By contrast, at a cycling trade show, more than half the vendors may have bicycles for sale and the others may sell bicycle parts and accessories. The system warning gives the user the opportunity to make the want more specific (e.g., buy-a-child's-motocross-bicycle") to reduce the number of alerts at the trade show, or to accept all the alerts and browse the full variety of offerings.

Looking up complementary list selections (such as "buy" for "sell" in the above example) is reasonably straightforward. Custom text typed in, speech-recognized, handwriting-recognized, or otherwise input by a user is more complex, especially when processing speed is crucial.

Figure 9:
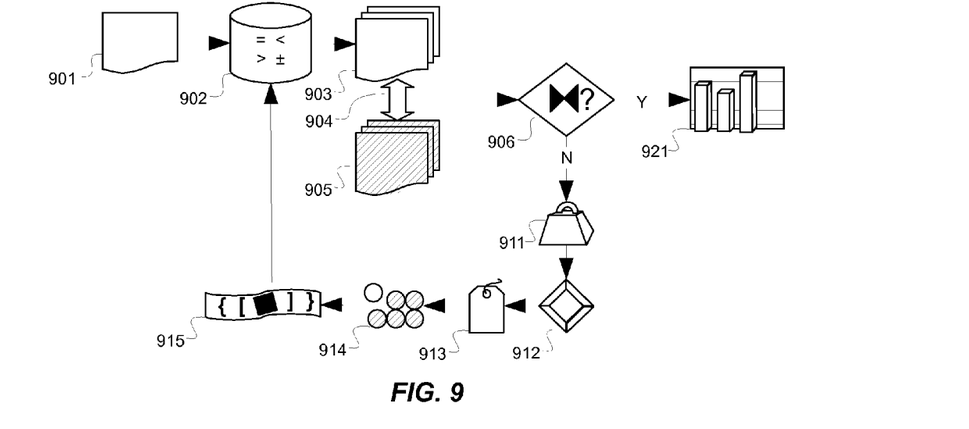
FIG. 9 is a flowchart of one of the linguistic processes used to analyze the custom-entered content of wants.

FIG. 9 is a flowchart of one of the linguistic processes used to analyze the custom-entered content of wants (as distinct from parts of the content chosen from system-defined lists) and find correspondences. When a want 901 is registered from a user's mobile device, the SML system queries a thesaurus database 902 with the custom content as-entered. The thesaurus database searches for synonyms ("="), first-level hypernyms ("<"), first-level hyponyms (">"), and first semantic cousins ("±", i.e. other first level hyponyms of the query term's first level hypernyms). The SML system then compares the resulting output semantic family 903 with other known wants 905 from within the proximate area using semantic comparison process 904, and checks for any correspondences 906.

If there are no correspondences at 906 ("N" arrow), the original input content string is submitted to further linguistic analysis such as squashing to lower case 911, tokenizing 912, tagging for part-of-speech 913, reducing any plurals to singulars 914, and a light parsing 915 to separate any modifiers from the central term they are modifying. The modified term is then sent through thesaurus database lookup 902 and comparison process 906 to see if any correspondences 906 appear. If none do, the lookup can be retried with fewer or no modifiers. For example, a want for "a pair of shoes that could be used for both walking and hiking" might ultimately need to be reduced to just "shoe" to produce a correspondence from the thesaurus database look-up.

If more than one correspondence emerges at 906, the correspondences are ranked, 921. A weight is assigned to each type of semantic correspondence; for example, a synonym would be awarded greater weight than a first level hyponym, and a hyponym greater weight than a first cousin correspondence.

In another embodiment, comparison process 904 with nearby want data 905 registered by other users may not be done until database lookup 902 yields a certain number or a certain quality of results 903.

Some embodiments support "identity wants." This particular class of want instructs the SML environment to "tell others like me that I am" a particular type of person, or a person in a particular situation. This can ease the pain of social isolation for people in difficulty who are uncomfortable advertising their position to the world at large: "Tell others like me that I am displaced from New Orleans by Hurricane Katrina" or "beginning chemotherapy" or "caring for a parent with Alzheimer's disease."

This powerful feature is also applicable to general social enrichment, especially in a new and unfamiliar place: "Tell others like me that I am a choir singer" or "a bridge player" or "a league bowler." Ad-hoc logistics can also be served by identity wants. One might, for instance, arrive at a resort or convention and "Tell others like me that I am traveling with elementary-school children." Others who answer the alert may have information to share about family-friendly locations and activities, and even offer opportunities to room or camp close together so the children and parents can socialize with new people. Personas and challenges can help validate those who answer the alert. For instance, a non-parent targeting parents in order to sell them expensive backyard jungle gyms would have difficulty answering a challenge to "send me a picture of your child" or "what did you do for your child's last birthday?" Until the challenges are satisfactorily answered, the devious salesperson will only see the parent's "Safe" or partially masked persona—not a complete enough sales lead to follow up with more pressure to buy a product.

Figure 10:
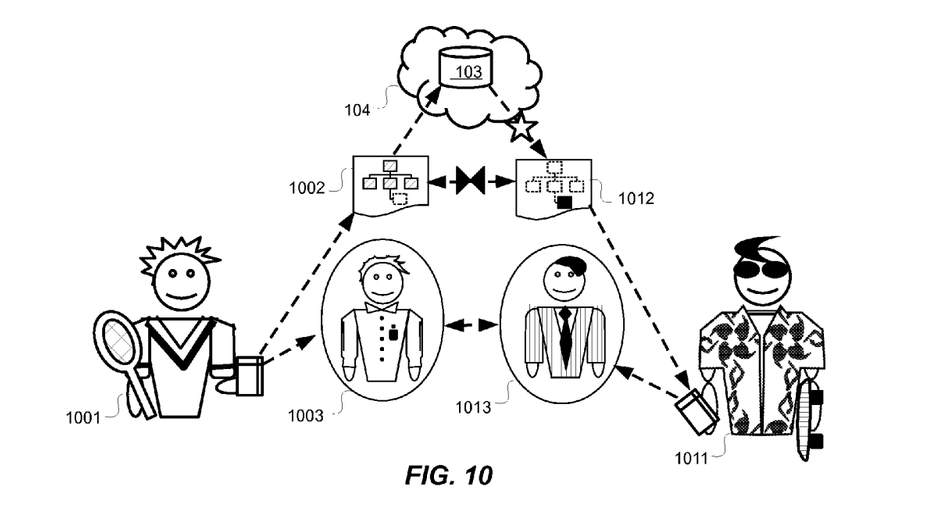
FIG. 10 is a conceptual illustration of how wants and personas can work together to capture elusive opportunities while users carry on normal lives.

FIG. 10 is a conceptual illustration of how wants and personas can work together to capture elusive opportunities while users carry on normal lives. User Chris 1001 is a recruiter who visits a local park to play tennis on a weekend. Just in case, Chris registers want 1002, hire-a-bank-manager, on behalf of a client. Running the want 1002 through SML program and database 102 in "cloud" computing network 104 results in a correspondence found: User Pat 1011, skateboarding elsewhere in the same park, registered want 1012, get-hired-as-a-bank-manager. Pat and Chris are neither dressed for, nor willing to focus on, business right at the moment. However, each of them have attached their business personas (1003 for Chris, 1013 for Pat) to wants 1002 and 1012 respectively. The alerts may contain very sparse information initially, with most of the information masked to protect Pat's and Chris's privacy. Each may issue a challenge to establish the other's credibility, which when answered will unmask the rest of the information in the business personas. From there, Pat and Chris can remotely set up a meeting for the next business day and exchange relevant documents, such as Chris's client's job description and Pat's resume, all within the SML environment.

Resource Management:

In some embodiments of the SML environment, users need not "check in" to tell the system their location has changed. This is convenient for those whose minds are fully occupied with other matters. However, overfrequent location transmissions can drain the mobile device's battery or other power source; overlarge search radii in spaces crowded with many users can tax computing resources and slow response time; and both of these can appropriate excessive bandwidth in the local network, which slows down not only this application but others running on the same network. Adaptive algorithms adjust search radii and cycle times to fit ambient conditions.

Figure 11:
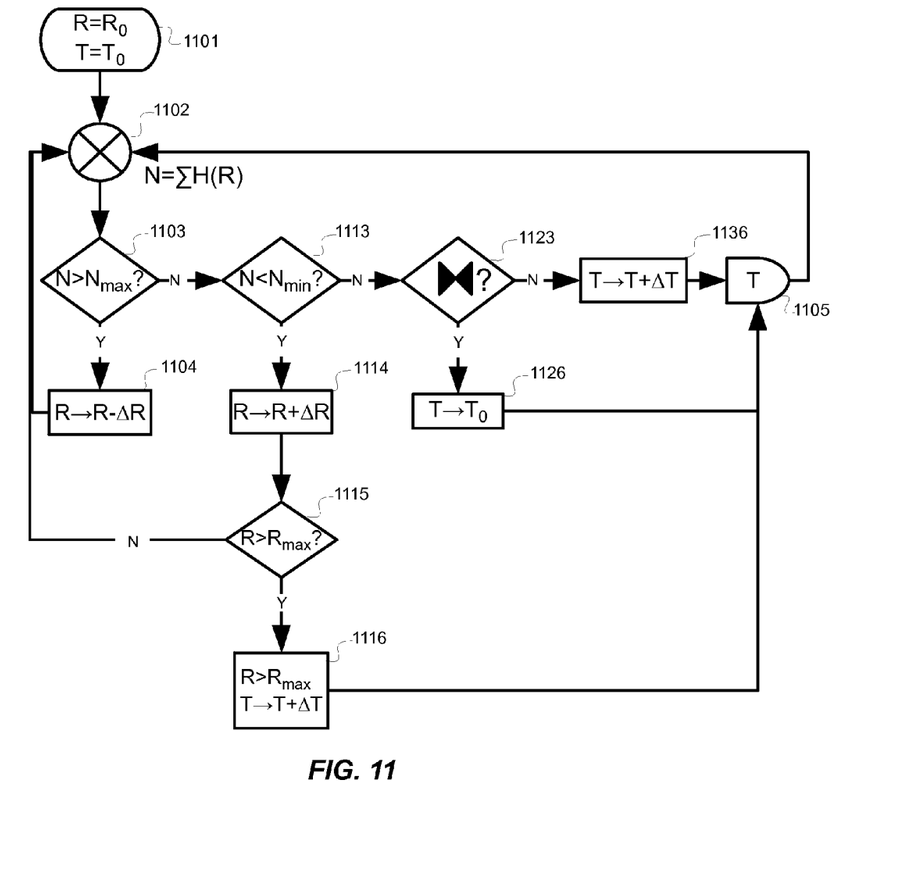
FIG. 11 is a flowchart of an adaptive algorithm for optimizing proximity-search radius and cycle timing.

FIG. 11 is a flowchart of an adaptive algorithm for optimizing proximity-search radius and cycle timing. When the device is turned on, the SML application activated, or its activities are otherwise started, proximity-search radius R and cycle time T are set to initial values $R_0$, $T_0$ (1101). In various embodiments $R_0$ and $T_0$ may be constants, variables depending on location, variables depending on user preferences, or variables refined by learning from previous results in that location, for that user, or for a type of want the user has registered. Next, a search is performed within the current radius R (initially=$R_0$) and all the hits H are summed (1102) resulting in a number-of-hits N. In various embodiments, a hit H may be the simple presence of another user, or something more refined such as a rough quasi-correspondence of wants and personas, e.g. all the generally bicycle-related proximate hits in the previous example. The system will have defined an allowed range $N_{min}$ to $N_{max}$, which may be constant, adaptive, location-sensitive, or user-adjustable.

If there are too many hits (1103), the system decreases the search radius (1104) by increment ΔR and tries searching and summing 1102 again. If there are too few hits (1113) the system increases the search radius (1114) by increment ΔR. Some embodiments will compare the new working radius to a maximum allowed search radius $R_{max}$ (1115). $R_{max}$ may be derived from a learned likelihood of diminishing returns beyond $R_{max}$, from system computational capacity or bandwidth constraints, from the range of a user's personal-area network, or from user preferences. If the new R<$R_{max}$, the system tries searching and summing 1102 again, but if the new R>$R_{max}$, the system sets R=$R_{max}$, increases cycle time T by an increment ΔT (1116) and waits an increased delay cycle 1105 before trying search and summing 1102 again. This step may be compared to the human decision "not much activity here; let's take a break and check again later."

If the number of hits N is within the allowed range, the system further analyzes the hits to see if there are any actual correspondences (1123). If not, the system increases cycle time T by an increment ΔT (1136, equivalent to the human decision "things are happening here but none of them interest me; I'll take a break and check back") and waits an increased delay cycle 1105 before trying search and summing 1102 again. However, if there are some actual correspondences, cycle time T is reset to default T0 (1126, equivalent of the human decision "interesting things are happening here, so let's pay attention"), waits a minimum delay cycle T (1105) and searches and sums again (1102). Meanwhile, other algorithms in the system are processing the correspondences found at 1123 and sending the appropriate alerts. Increments ΔR and ΔT, like the other variables in this algorithm, may be constant, user-controlled, adaptive, location-sensitive, or driven by other physical considerations such as network capacity, mobile-device capabilities, and signal reception.

Those skilled in the art will recognize that many alternate versions are possible by minor variations on the descriptions and drawings presented here. Therefore, the reader should note that only the claims, and not this description or the associated drawings, limit the scope of the invention.

We claim:

1. A method, comprising:
    storing a list of request-type wants and a list of corresponding offer-type wants on at least one network server,
    receiving information describing the locations of a plurality of client devices communicatively connected to the server,
    receiving, from a first client device, a first want registered by a first user,
        where the registering of the first want comprises entering custom text, and where the custom text comprises a form of an input verb and an input noun phrase,
    storing the first want on the server,
    generating a first semantic family of verbs complementary to the input verb,
    generating a second semantic family of the complete noun phrase,
        combining the first semantic family and the second semantic family into a combined semantic family of wants,
    semantically comparing the combined semantic family of wants with at least one other known wants previously registered by at least one other user whose client device is located less than a threshold distance from the first user's client device,
    identifying any of the other known wants matching part of the combined semantic family as complements of the first want,
    if no complements are found, expanding the combined semantic family by additional linguistic analysis and repeating the semantically comparing,
    if at least one complement is found, weighting each of the complements' degree of semantic correspondence to the first want,
    sending information about the complements to the first client device in order of decreasing weight, and
    sending information about the first want to each user who registered one of the complements.

2. The method of claim 1, where the generating of the first semantic family of verbs comprises detecting forms of verbs that were previously stored on the server as complementary verb pairs.

3. The method of claim 1, where the forms of verbs in the complementary verb pairs are neither identical, nor similar, nor synonymous to the form of the verb in the first want.

4. The method of claim 1, where the additional linguistic analysis comprises at least one of squashing to lowercase, tokenizing, tagging for part of speech, reducing a plural to a singular, or separating a modifier from a central term being modified if it does not change the meaning of the central term.

5. The method of claim 1, further comprising increasing the threshold distance and semantically comparing the combined semantic family with known wants originating within the increased threshold distance.

6. The method of claim 1, where both the first want and the complement comprise "to tell others like me that I am a" or a synonymous phrase.

7. The method of claim 1, further comprising receiving, from the first client device, information describing a first persona created to represent the first user.

8. The method of claim 7, where the persona comprises a user-edited subset of data from a pre-existing online profile.

9. The method of claim 7, where creating the persona comprises:
    automatically aggregating data about the first user from multiple online sources onto the server or the first client device, and
    providing an editing function on the first client device to enable the first user to edit the data.

10. The method of claim 7, where one of the alerts comprises information about a second persona created by a second user who registered the complementary want.

11. The method of claim 7, where the persona comprises a rule defining a condition, where the condition must be met before at least a subset of the information about the first persona may be transmitted to the client device of another user.

12. The method of claim 11, where the persona comprises a plurality of rules arranged in a cascading hierarchy.

13. The method of claim 7, where the alert to the other client device comprises less than all the information of the first persona and a challenge composed or selected by the first user, and where the method further comprises:
    relaying a response to the challenge from the second user's client device to the first user's client device; and
    if the first user accepts the response, sending all the information of the first persona to the other client device.

14. The method of claim 7, where the alert to the other client device comprises a challenge but does not comprise a location of the first user's client device, and further comprising:
    relaying a response to the challenge from the second user's client device to the first user's client device; and
    if the first user accepts the response, sending the location to the other client device.

15. The method of claim 1, further comprising sending a message to the first client device before sending the alert if the number of detected complements exceeds a threshold quantity.

16. The method of claim 1, further comprising, if no complement is found:
   increasing the threshold distance and comparing the first want with other known wants from devices located within the increased threshold distance, or
   removing a modifier from the first want and repeating the linguistically analyzing for the resulting broadened first want,
where removing the modifier does not change the meaning of the noun phrase.

17. The method of claim 7, further comprising receiving an additional persona from the first client device,
   where the additional persona differs from the first persona, and
   where the first persona and the additional persona represent different aspects of the first user.

18. The method of claim 7, further comprising receiving and storing user-selected criteria describing the types of other users to whom one, both, or neither of the first persona or the additional persona will be visible.

19. The method of claim 7, further comprising receiving and storing status information for the first persona and the additional persona, where a status of the first persona and a status of the additional persona differ from each other.

20. The method of claim 1, further comprising:
   defining a minimum size for the first semantic family, the second semantic family, or the combined semantic family;
   delaying the semantically comparing until the minimum size is reached or exceeded.

* * * * *